United States Patent [19]

Ramanathan et al.

[11] 4,033,943
[45] July 5, 1977

[54] FIBER REACTIVE WATER SOLUBLE 2,4,6-TRIAMINO, 3-CYANO PYRIDINE-(5) AZO DYESTUFFS

[75] Inventors: Visvanathan Ramanathan; Angelo Della Casa, both of Basel; Rene de Montmollin, Riehen; Gert Hegar, Schonenbuch; Hans Ulrich Schutz, Basel, all of Switzerland

[73] Assignee: Ciba-Geigy Corporation, Ardsley, N.Y.

[22] Filed: Feb. 21, 1975

[21] Appl. No.: 551,794

[30] Foreign Application Priority Data

Feb. 26, 1974 Switzerland .................. 2689/74

[52] U.S. Cl. ................... 260/153; 260/154;
260/156; 260/247.1 M; 260/247.2 R;
260/247.2 A; 260/247.2 B; 260/247.5 G;
260/249.8; 260/256.4 N; 260/256.5 R;
260/293.69; 260/294.9; 260/295.5 R;
260/295.5 A; 260/296 R; 260/294.8 F; 8/41
B; 8/50; 8/51

[51] Int. Cl.² .................. C09B 29/36; C09B 43/12;
C09B 43/16

[58] Field of Search .................. 260/153, 154, 156

[56] References Cited

UNITED STATES PATENTS

| | | | |
|---|---|---|---|
| 1,724,305 | 8/1929 | Ostromislensky | 260/156 |
| 1,802,062 | 4/1931 | Ostromislensky | 260/156 |
| 2,029,315 | 2/1936 | Englemann | 260/156 |
| 2,068,353 | 1/1937 | Schneiderwirth | 260/156 |
| 3,527,748 | 9/1970 | Ackermann et al. | 260/154 |
| 3,531,456 | 9/1970 | Ackermann et al. | 260/154 |
| 3,531,457 | 9/1970 | Ackermann et al. | 260/154 |
| 3,531,458 | 9/1970 | Ackermann et al. | 260/154 |
| 3,532,682 | 10/1970 | Ackermann et al. | 260/154 |
| 3,725,383 | 4/1973 | Austin et al. | 260/153 X |
| 3,853,895 | 12/1974 | Lamm et al. | 260/156 X |

FOREIGN PATENTS OR APPLICATIONS 270,987  9/1950  Switzerland .................. 260/156

*Primary Examiner*—Charles F. Warren
*Attorney, Agent, or Firm*—Karl F. Jorda; Edward McC. Roberts; Michael W. Glynn

[57] ABSTRACT

Water-soluble azo dyes of the formula

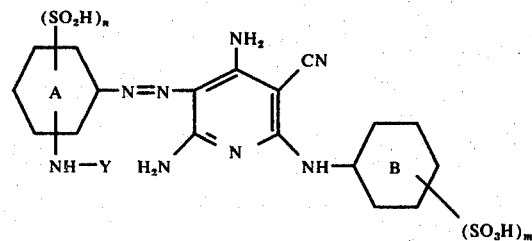

wherein Y is a fiber-reactive group, $n$ is 1 or 2, $m$ is 0, 1 or 2 and the benzene rings A and B may be further substituted are disclosed. They are useful for dyeing nitrogen-containing fibers and cellulose materials and are distinguished by very bright and brilliant shades, possessing good stability, fastness to light, wet processing and fixation.

7 Claims, No Drawings

FIBER REACTIVE WATER SOLUBLE 2,4,6-TRIAMINO, 3-CYANO PYRIDINE-(5) AZO DYESTUFFS

The invention provides water-soluble azo dyes of the formula

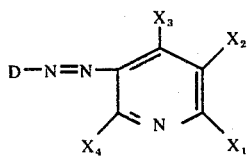
(1)

wherein D is the radical of a diazo component, each of $X_1$ and $X_4$ is an unsubstituted or substituted amino, alkoxy, aryloxy, alkylmercapto, arylmercapto or aralkyloxy group or a heterocyclic radical, $X_2$ is a hydrogen atom, a cyano, carboxy amide, carboxylic acid ester or carboxy group and $X_3$ is an unsubstituted or substituted amino group, and at least one of the substituents $X_1$ and $X_4$ is an amino group and the azo dye of the formula (1) contains at least one water-solubilising group.

The diazo radical is an aromatic or a heterocyclic radical which can itself contain an azo group or which is derived from a compound of the anthraquinone, nitroaryl, phthalocyanine, or stilbene class or the like. The diazo radical is especially a radical of the benzene or naphthalene class.

The water-soluble azo dyes of the formula (1) can exist in a number of tautomeric forms. To simplify the description, the compounds are represented in the formulae in only one of these tautomeric forms. It must be explicitly stated, however, that throughout this specification, especially in the claims, the description always refers to compounds in any one of these tautomeric forms.

The water-soluble azo dyes of the formula (1) can contain in the molecule one or more than one fibre-reactive radical, for example a halogenotriazine radical. In addition to being substituted by water-solubilising groups, for example sulphonic acid, carboxyl or quaternised amino groups, the azo dyes can be substituted in the usual way by other atoms or groups of atoms, for example by halogen atoms, hydroxy, amino, alkyl, aryl, alkoxy, aryloxy, acylamino, cyano, acyl, carboalkoxy, acyloxy, nitro groups etc., and this both in the radical of the diazo component and in the radical of the coupling component.

Examples of the substituents $X_1$ and $X_4$ are: monoalkylamino or dialkylamino groups with 1 to 6 carbon atoms in the alkyl moiety, with the alkyl radicals together with the nitrogen atom of the amino group being able to form a ring of at least 7 carbon atoms which may contain additional heteroatoms, for example nitrogen or oxygen atoms; arylamino groups, especially phenylamino and naphthylamino groups, in which the aryl moiety can be substituted by carboxy, alkyl, alkoxy, halogen atoms, such as chlorine or bromine, and especially by sulpho groups, for example mono- and disulphophenylamino groups and mono-, di- and trisulphonaphthylamino groups, the preferred sulphonaphthylamino groups, the preferred sulphonaphthalamino groups being the mono- and di- sulphonaphthalamino groups; alkoxy groups, especially those with at least 6 carbon atoms in the alkyl moiety, which is unsubstituted or substituted by halogen, hydroxy or low molecular alkoxy; aryloxy groups, especially phenoxy groups which may contain sulpho groups; alkylmercapto groups, especially those with at most 6 carbon atoms in the alkyl moiety, which is unsubstituted or substituted by halogen, hydroxy or low molecular alkoxy; arylmercapto, especially phenylmercapto; aralkoxy, especially benzyloxy. The substituent $X_1$ is preferably the radical of an aliphatic or an aromatic amine or of a phenol. The substitutent $X_3$ is preferably an alkylamino group with at most 6 carbon atoms in the alkyl moiety, and is in particular the $H_2N$ group.

Groups which are capable of reacting with the hydroxy groups of cellulose or with the amino groups of polyamides to form a covalent chemical bond are possible reactive radicals.

Such a group is in particular a low molecular alkanoyl or alkylsulphonyl radical which is substituted by a removable group, a low molecular alkenoyl or alkenesulphonyl radical which is unsubstituted or substituted by a removable atom or a removable group, a carbocyclic or heterocyclic radical containing 4, 5 or 6 rings which is substituted by a removable atom or a removable group and which is bonded through a carbonyl or sulphonyl group, or a triazine or a pyramidine radical which is substituted by a removable atom or a removable group and which is bonded direct through a carbon atom, or such a group contains such a radical.

The reactive radical is preferably a 6-membered heterocyclic radical which is bonded through an amino group and contains halogen atoms, for example a halogenotriazine or halogenopyrimidine radical or an aliphatic acyl radical.

In particular, the fibre-reactive radical is a radical of the formula $—N(R_1)—Z$, wherein $R_1$ is a low molecular alkyl radical or preferably a hydrogen atom and Z is a 4,6-dihalogeno-s-triazinyl-(2) radical, a 4-halogeno-6-amino(alkoxy, phenoxy, alkylmercapto or arylmercapto)-s-triazinyl-(2) radical or an $\alpha,\beta$-dibromopropionyl radical or an $\alpha$-bromoacrylyl radical. By low molecular alkyl radicals are meant in this context alkyl radicals of up to 4 carbon atoms, e.g. methyl, ethyl, propyl, isopropyl or butyl.

The invention provides in particular water-soluble azo dyes of the formula

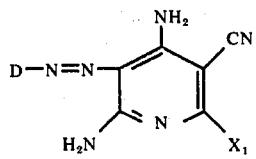
(2)

wherein D is the radical of a diazo component, $X_1$ is an amino, alkoxy, aryloxy, alkylmercapto, arylmercapto or aralkyloxy group or a heterocyclic radical, and wherein D and/or $X_1$ contains at least one sulphonic acid group.

A special group of the water-soluble azo dyes of the formula (2) comprises those of the formula

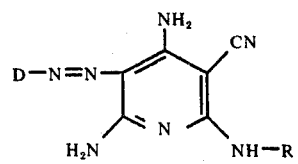
(3)

wherein D is a benzene or a naphthalene radical which

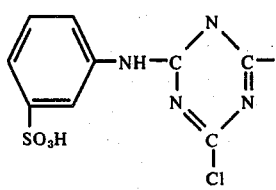

or

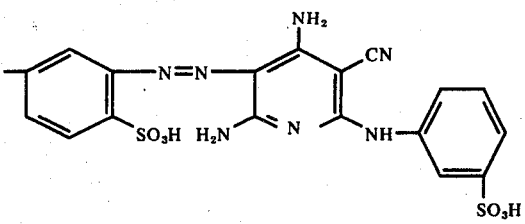

contains one or two sulphonic acid groups and may contains as further substituents low molecular alkyl or alkoxy groups, halogen atoms, hydroxy, nitro, amino, carboxy, acyl, acyloxy, acylamino, alkylsulphonyl, arylsulphonyl, aminosulphonyl, cyano or alkoxycarbonyl groups, and wherein R is a sulpoaryl radical.

Water-soluble azo dyes with a particularly interesting utility are those of the formula (1) that contain one fibre-reactive radical in the radical of the diazo component and/or in the radical of the coupling component.

As dyes of this kind there may cited principally:
1. Water-soluble azo dyes of the formula

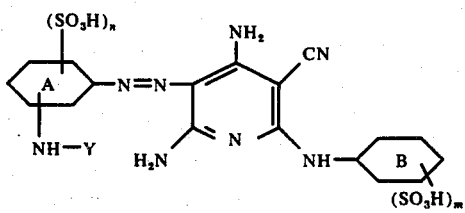

(4)

wherein Y is an aliphatic fibre-reactive acyl radical, $n$ is 1 or 2, $m$ is 0, 1 or 2, the benzene ring A can be further substituted by halogen, low molecular alkyl or alkoxy, nitro or carboxy and the benzene ring B by low molecular alkyl or alkoxy, nitro, carboxy or acylamino, especially water-soluble azo dyes of the formula (4), wherein Y is an $\alpha,\beta$-dibromopropionyl radical or an $\alpha$-bromoacrylyl radical and the benzene ring B may contain a further $\alpha,\beta$-dibromopropionylamino group or $\alpha$-bromoacrylylamino group.

2. Water-soluble azo dyes of the formula (4), wherein Y is a heterocyclic fibre-reactive radical, $n$ is 1 or 2, $m$ is 0, 1 or 2, the benzene ring A can be further substituted by halogen, low molecular alkyl or alkoxy, nitro or carboxy and the benzene ring B by low molecular alkyl or alkoxy, nitro, carboxy or acylamino, especially water-soluble azo dyes of the formula (4), wherein Y is a 4,6-dihalogeno-s-triazinyl-(2) radical or a 4-halogeno-6-amino(alkoxy, phenoxy, alkylmercapto)-s-triazinyl-(2) radical and the benzene ring B may contain a further 4,6-dihalogeno-s-triazinyl-(2) or 4-halogeno-6-amino (alkoxy, phenoxy, alkylmercapto or arylmercapto)-s-triazinyl-(2) radical. Examples of water-soluble azo dyes of the cited kind are dyes of the formulae

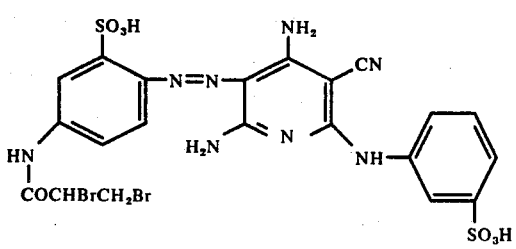

Importance also attaches to water-soluble azo compounds of the formula (1), which contain one fibre-reactive radical in the diazo and coupling component, for example compounds of the formula (4), which in addition to the reactive radical Y contain a further reactive radical in the benzene residue B.

The invention also provides a process for the manufacture of the water-soluble azo dyes of the formula (1), which process comprises coupling a diazo component of the formula $$D-NH_2 \quad (5)$$

wherein D has the meaning assigned to it in the explanation of formula (1), with a coupling component of the formula

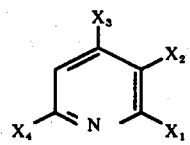

(6)

wherein $X_1$ to $X_4$ have the meanings assigned to them in the explanation of the formula (1), and acylating the resultant azo dye, if desired, with an acylating agent.

A preferred process comprises coupling a diazo component of the formula $$D-NH_2 \quad (5)$$

wherein D has the meaning assigned to it hereinbefore, with a coupling component of the formula

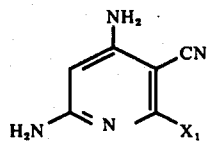

(7)

wherein $X_1$ is an amino, alkoxy, aryloxy, alkylmercapto, arylmercapto or aralkyloxy group or a heterocyclic radical, and D and/or $X_1$ contains at least one sulphonic acid group.

The radical of the diazo component D in formula (5) is preferably a benzene or a naphthalene radical which contains one or two sulphonic acid groups and may contain as further substituents low molecular alkyl or alkoxy groups, halogen atoms, hydroxy, nitro, amino, carboxy, acyl, acyloxy, acylamino, alkylsulphonyl, arylsulphonyl, aminosulphonyl, cyano or alkoxycarbonyl groups.

Preferred coupling components are those of the formula

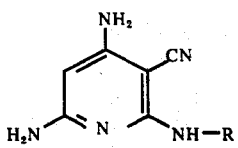

wherein R is a sulphoaryl radical.

In a preferred embodiment of the invention, a start is made from diazo components and/or coupling components which contain fibre-reactive radicals.

The special water-soluble azo dyes of the formula (1) are manufactured by coupling a diazo component of the formula

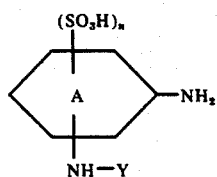

wherein Y is an aliphatic fibre-reactive acyl radical, $n$ is 1 or 2 and the benzene ring can be further substituted by halogen, low molecular alkyl or alkoxy, nitro or carboxy, with a coupling component of the formula

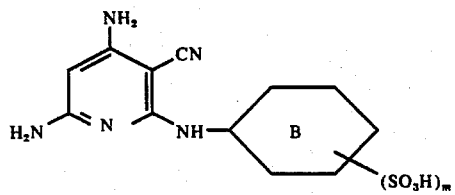

wherein $m$ is 0, 1 or 2 and the benzene ring B can be further substituted by low molecular alkyl or alkoxy, nitro, carboxy or acylamino.

It is also possible to obtain the azo dyes of the formula (4) by coupling a diazo component of the formula (9), wherein Y is a hydrogen atom or an acyl radical and $n$ and A have the indicated meanings, with a coupling component of the formula (10), wherein $n$ is 0, 1 or 2 and the benzene ring B can be further substituted by low molecular alkyl or alkoxy, nitro, carboxy, acylamino or amino, and reacting the resultant azo dye, if desired after splitting off the acyl radical Y by saponification, in order to introduce one or — if the benzene ring B contains an acylatable amino group — two aliphatic fibre-reactive acyl radicals, with an aliphatic fibre-reactive acylating agent.

Important fibre-reactive acylating agents are α-β-dibromopropionyl halide and α-bromoacrylyl halide.

Importance also attaches to a modification of the process according to which a diazo component of the formula (9), wherein Y is an α,β-dibromopropionyl radical or an α-bromoacrylyl radical and $n$ and A have the indicated meanings, is coupled with a coupling component of the formula (10), wherein $n$ and B have the meanings assigned to them hereinbefore and the benzene ring B may contain a further α,β-dibromopropionylamino group or α-bromacrylylamino group.

In order to obtain the equally important water-soluble azo dyes of the formula (4) which contain a heterocyclic fibre-reactive radical, the procedure is to couple a diazo component of the formula

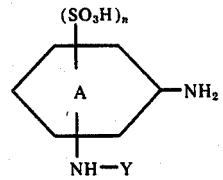

wherein Y is a heterocyclic fibre-reactive radical, $n$ is 1 or 2 and the benzene ring A can be substituted by halogen, low molecular alkyl or alkoxy, nitro or carboxy, with a coupling component of the formula

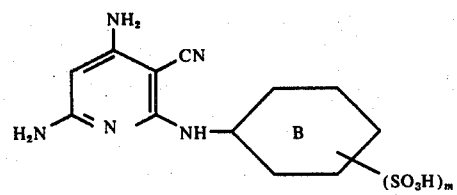

wherein $m$ is 0, 1 or 2 and the benzene ring B can be further substituted by low molecular alkyl or alkoxy, nitro, carboxy or acylamino, or to couple a diazo component of the formula (9), wherein Y is a hydrogen atom or an acyl radical and $n$ and A have the meanings assigned to them hereinbefore, with a coupling component of the formula (10), wherein $m$ is 0, 1 or 2 and the benzene ring can be further substituted by low molecular alkyl or alkoxy, nitro, carboxy, acylamino or amino, and to react the resultant azo dye, if desired after removal of the acyl radical Y by saponification, in order to introduce one or — if the benzene ring B contains an acylatable amino group- two heterocyclic fibre-reactive radicals, with a heterocyclic fibre-reactive acylating agent.

A suitable heterocyclic fibre-reactive acylating agent is in particular a 2,4,6-trihalogeno-s-triazine or a 2,4-dihalogeno-6-amino(alkoxy, phenoxy, alkylmercapto or arylmercapto)-s-triazine.

Other important fibre-reactive azo dyes are obtained by coupling a diazo component of the formula (9), wherein Y is a 4,6-dihalogeno-s-triazinyl-(2) radical or a 4-halogeno-6-amino (alkoxy, phenoxy, alkylmercapto or arylmercapto)-s-triazinyl-(2) radical and $n$ and A have the meanings previously assigned to them, with a coupling component of the formula (10), wherein $m$ and B have the above meanings and the benzene ring B may contain a further 4,6-dihalogeno-s-triazinyl-(2)-amino group or 4-halogeno-6-amino(alkoxy, phenoxy, alkylmercapto or arylmercapto)-s-triazinyl-(2)-amino group.

Those fibre reactive azo dyes which contain one or more monohalogeno-s-triazine radicals in the molecule are also obtained by the above described methods of manufacture by using a 2,4,6-trihalogeno-s-triazine as heterocyclic fibre-reactive acylating agent or by using diazo components and/or coupling components which contain a 4,6-dihalogeno-s-triazinyl-(2) radical, and by replacing in the resultant azo dye, which contains one or two fibre-reactive 4,6-dihalogeno-s-triazinyl-(2) radicals, a halogen atom by reaction with ammonia, an amine, an alcohol, a phenol or a mercaptan by an amino, an alkoxy, a phenoxy, an alkylmercapto or an arylmercapto group.

Those water-soluble azo dyes which are obtained according to the invention and which contain one or two α,β-dibromopropionyl radicals can be treated with dehydrohalogenating agents, for example sodium hydroxide, in order to convert the α,β-dibromopropionyl radical or radicals into α-bromoacrylyl radicals.

Depending on the starting materials chosen, it is also possible to manufacture by the methods described hereinbefore bisreactive dyes of the formula (1) which contain two different fibre-reactive radicals, for example an α,β-dibromopropionyl radical and a 4,6-dichloro-s-triazinyl-(2) radical.

The diazotisation is effected by known methods, for example using hydrochloric acid and sodium nitrite. The coupling with the aminopyridine is also carried out by known methods in an acid to a weakly alkaline medium.

The diazo components of the following amines may be cited as examples of diazo components which can be used for the manufacture of the water-soluble azo compounds of the formula (1):
aminobenzene,
1-amino-4-chlorobenzene,
1-amino-4-bromobenzene,
1-amino-4-methylbenzene,
1-amino-2-nitrobenzene
1-amino-4-nitrobenzene,
1-amino-4-cyanobenzene,
1-amino-2,5-dicyanobenzene,
1-amino-4-methylsulphonylbenzene,
1-amino-4-carbalkoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-chlorobenzene,
1-amino-2-carbomethoxy-4-nitrobenzene,
1-amino-2-chloro-4-cyanobenzene,
1-amino-2-choro-4-nitrobenzene,
1-amino-2-bromo-4-nitrobenzene,
1-amino-2-chloro-4-carboethoxybenzene,
1-amino-2-chloro-4-methylsulphonylbenzene,
1-amino-2-hydroxybenzene,
1-amino-4-nitrobenzene-2-sulphonic acid,
1-aminobenzene-2,5-disulphonic acid,
1-aminobenzene-2,4-disulphonic acid,
1-amino-4-carboxybenzene-2-sulphonic acid,
1-aminobenzene-2-, -3- or -4-sulphonic acid,
1-amino-4-chlorobenzene-2-sulphonic acid,
1-amino-3-chloro-4-nitrobenzene-6-sulphonic acid,
1-amino-6-hydroxybenzene-3-sulphonic acid,
1-amino-4-methylbenzene-6-sulphonic acid,
1-amino-4-ethoxybenzene-6-sulphonic acid,
1-amino-4-chloroacetylaminobenzene-2-sulphonic acid,
1-amino-4-α,β-dibromopropionylaminobenzene-2-sulphonic acid,
1-amino-4-chloroacetylaminobenzene-2,5-disulphonic acid,
1-amino-5-(α-bromoacrylylamino)-benzene-2-sulphonic acid,
1-amino-4-(α,β-dibromopropionylamino)-5-methoxybenzene-2-sulphonic acid,
1-amino-4-(α,β-dibromopropionylamino)-5-methylbenzene-2-sulphonic acid,
1-amino-4-methyl-5-(α-bromoacrylylamino)-benzene-2-sulphonic acid,
1-amino-4-(α,β-dibromopropionylamino)-benzene-2,6-disulphonic acid,
1-aminonaphthalene,
2-aminonaphthalene,
1-aminonaphthalene-4-sulphonic acid,
2-aminonaphthalene-6-sulphonic acid,
2-aminonaphthalene-1-sulphonic acid,
2-aminonaphthalene-6,8-, -4,8- or -5,7-disulphonic acid,
2-aminonaphthalene-4,6,8-trisulphonic acid,
2-amino-8-hydroxynaphthalene-6-sulphonic acid,
3-amino-8-hydroxynaphthalene-6-sulphonic acid,
1-amino-8-hydroxynaphthalene-3,6- or -4,6-disulphonic acid,
3-, 5-, 6- or 8-amino-quinoline,
8-aminoquinoline-5-sulphonic acid,
2-amino-benz -1,3-thiazole,
2-amino-6-nitrobenz-1,3-thiazole,
2-amino-6-methoxybenz-1,3-thiazole,
2-aminothiophene,
3-aminoindole,
3-aminoindazole,
3-aminopyridine,
2-amino-1,3-thiazole,
3-aminopyrazole,
4-amino-3-methyl-1-phenyl-pyrazole,
5-amino-3-phenyl-1,2,4-thiadiazole,
4- or 5-amino-imidazole.

Important coupling components of the formula (6) are:
2-(3'-sulphophenylamino)-3-cyano-4,6-diamino-pyridine,
2-phenylamino-3-cyano-4,6-diamino-pyridine,
2-(4'-α-bromoacrylylamino-phenylamino)-3-cyano-4,6-diaminopyridine,
2-cyclohexylamino-3-cyano-4,6-diamino-pyridine,
2-(3'-sulpho-4'-α-bromoacrylylamino-phenylamino)-3-cyano-4,6-diamino-pyridine,
2-(4'-sulpho-3'-α-bromoacrylylamino-phenylamino)-3-cyano-4,6-diamino-pyridine,
2-[3'-sulpho-4'-(4''-chloro-6''-amino-s-triazinyl-2-amino)-phenylamino]-3-cyano-4,6-diamino-pyridine.

Coupling components of the formula (6) can be manufactured by reaction of 2-bromo-3-cyano-4,6-diamino-pyridine with a primary or secondary amine, a hydroxy or mercapto compound.

The halogeno-diamino-pyridines can be obtained according to: Boldt et al., Angew. Chemie, vol. 82 (1970), p. 392; Cossey et al., Angew. Chemie, vol. 84 (1972), p. 1184; Middleton, U.S. Pat. No. 2,790,806; Sakasi et al., Tetrahedron Letters (1971), p. 4593.

In the 3-cyano-4,6-diamino-pyridines mentioned hereinbefore, the cyano group can be saponified to give the carboxy amide group.

The 4,6-diamino-pyridine, into which other substituents can be introduced by further reactions, can be obtained by removing the carboxy group by hydrolysis.

Azo compounds of the formula (1) which contain one or more fibre-reactive groups can be manufactured by using diazo and coupling components which already contain reactive groups. However, in many cases it is also possible to introduce reactive groups into the azo compounds subsequently. The introduction can be effected after the coupling.

The reactive radical is introduced preferably by acylation of corresponding diazo components which, in addition to the amino group to be acylated, also contain an additional acylatable amino group or a group which can be converted into an acylatable amino group e.g. by reduction or saponification, for example the nitro group or the acetylamino group.

Examples of corresponding diazo components which are suitable for the introduction of a fibre-reactive radical are:
1,3-diaminobenzene-4-sulphonic acid,
1,3-diaminobenzene-4,6-dusulphonic acid,
1,4-diaminobenzene-2-sulphonic acid,
1,4-diaminobenzene-2,5- or -2,6-disulphonic acid,
1,3-diamino-4-methylbenzene-6-sulphonic acid and monoacetyl derivatives thereof
1-amino-4-nitrobenzene,
1-amino-2-chloro-4-nitrobenzene,
6-acetylamino-4-chloro-2-aminophenol,
6-nitro-4-methyl-2-aminophenol,
4-nitro-2-aminophenol-6-sulphonic acid,
6-acetylamino-1-amino-2-naphthol-4-sulphonic acid and other compounds, for example those already cited in the enumeration of possible diazo components.

Examples of suitable aminoazo compounds into which the fibre-reactive radicals can be introduced after the coupling are the coupling products of the above mentioned diazo components with pyridines of the formula (6).

If the reactive radical contains still further readily removable substituents, for example halogen atoms, as in the dichlorotriazine radical, then it can be condensed with compounds which contain a reactive hydrogen atom which is bonded through a heteroatom and is able to react with a removable substituent of the reactive radical to form a functional group which is bonded through the heteroatom. In this way especially a chlorine atom in the dichlorotriazine radical can be replaced by one of the corresponding radicals by reaction with ammonia, an amine, an alcohol, a phenol or mercaptan.

Instead of subsequently replacing a halogen atom in a dihalogenotriazine radical by an amino, alkoxy, aryloxy group or a mercapto group, it is also possible to use a fibre-reactive acylating agent a dihalogenotriazine which already contains an amino, alkoxy, aryloxy or mercapto group bonded to the triazine ring.

Fruther important azo compounds are those of the formula (1) which contain a monohalogenotriazine radical which is bonded through an amino group, and which in addition to the halogen atom contains an amino group bonded to the triazine ring, with a further fibre-reactive radical, especially halogenotriazine radical, being bonded to this amino group. If the second, additional fibre-reactive radical is a halogenotriazine radical, it is bonded preferably through the radical of an alkylenediamine or arylenediamine to the first triazine radical. The fibre-reactive amino group which is present in the monohalogenotriazine radical in addition to the halogen atom therefore preferably has the structure

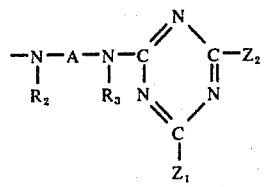
(11)

wherein $R_2$ and $R_3$ are hydrogen atom or a low molecular alkyl radical, A is an alkylene or an arylene radical, $Z_1$ is a halogen atom, e.g. a fluorine, chlorine, or bromine atom, and $Z_2$ is a halogen atom, an amino, alkoxy, aryloxy, alkylmercapto or arylmercapto group. Low molecular alkyl radicals are to be understood as meaning in this context alkyl radicals of 1 to 4 carbon atoms. A can be an alkylene radical with short or long chain, for example an ethylene or a hexylene radical; but preferably A is a benzene residue, for example a m-phenylene or p-phenylene radical, especially a phenylene-sulphonic acid radical.

Suitable alkoxy groups are radicals of primary, secondary or tertiary alcohols, for example the methoxy, ethoxy, propyloxy, isopropoxy, or 1,1-dimethylethoxy group, radicals of etherified dialcohols, for example the ethoxyethoxy or methoxypropyloxy group, radicals of unsaturated aliphatic alcohols, for example the allyloxy or propargyloxy group, or radicals of aliphatic alcohols which contain cyclic groups, for example the benzoyloxy, furfuryloxy or tetrahydrofurfuryloxy group. As aryloxy groups there may be cited radicals of phenols and naphthols, especially the phenoxy, sulphophenoxy or disulphophenoxy group. As alkylmercapto or arylmercapto groups there may be mentioned the methylmercapto and phenylmercapto groups.

In a particular embodiment of the invention, $Z_2$ is the chromogenic radical of the compounds of the formula (1).

Suitable acylating agents which contain a reactive radical are in particular the halides or anhydrides of organic acids which contain readily removable atoms or groups of atoms.

As examples of acylating agents which contain a fibre-reactive radical there may be cited the following:
chloro- or bromoacetyl chloride
β-chloro- or β-bromopropionyl chloride α,β-dichloro- or α,β-dibromopropionyl chloride
chloromaleic anhydride
carbyl sulphate
acrylic chloride
4,5-dichloro-1-phenylpyridazonecarboxylic or sulphonic acid chloride
4,5-dichloropyridazopropionic acid chloride
1,4-dichlorophthalazinecarboxylic or sulphonic acid chloride
2,3-dichloroquinoxalinecarboxylic or sulphonic acid chloride
2,4-dichloroquinazolinecarboxylic or sulphonic acid chloride
2-methanesulphonyl-4-chloro-6-methylpyrimidine
2,4-bis-methanesulphonyl-6-methylpyrimidine
2,4,6-trichloropyrimidine or 2,4,5,6-tetrachloropyrimidine
2,4,6-tribromopyrimidine or 2,4,5,6-tetrabromopyrimidine
2-methanesulphonyl-4,5-dichloro-6-methylpyrimidine
2,4,6-trichloro-5-bromopyrimidine
2,4,5,6-tetrafluoropyrimidine
4,6-difluoro-5-chloropyrimidine
2,4,6-trifluoro-5-chloropyrimidine
2,4,5-trifluoropyrimidine
2,4,6-trichloro-(tribromo- or trifluoro-)1,3,5-triazine, and 4,6-dichloro-(dibromo- or difluoro-)1,3,5-triazines, which are substituted in 2-position cyan aryl or alkyl radical, e.g. a phenyl, methyl, or ethyl radical, or by the radical of an aliphatic or aromatic mercapto compound which is bonded via the sulphur atom or of a hydroxyl compound which is bonded via the oxygen atom, or especially by a NH₂ group or by the radical of an aliphatic, heterocyclic or aromatic amino compound which is bonded via the nitrogen atom.

The acylations with the fibre-reactive acylating agents and the condensation with compounds which contain a reactive hydrogen atom bonded via a heteroatom are advantageously carried out with the use of acid acceptors, such as sodium carbonate or sodium hydroxide, and under such conditions that there still remain in the fibre-reactive radical of the finished product replaceable halogen atoms, unsaturated bonds or the like, i.e., these reactions are carried out for example in organic solvents or at relatively low temperatures in aqueous media.

The azo compounds obtainable according to the present process and its modifications are new; they are suitable for dyeing and printing widely different types of materials, such as, for example, silk, leather, wool, synthetic fibres of polyamides and polyurethanes, polyhydroxylated materials, for example cellulose-containing materials of fibreous structure, such as linen, cellulose, regenerated cellulose, cotton and the like.

The most important compounds are those azo compounds which contain a reactive radical and a sulphonic acid group. These dyes are preferably used for dyeing nitrogen-containing fibres, for example, polyamides, polyurethanes, silk, leather and in particular wool, for example from weakly acid, neutral or weakly alkaline baths, optionally with the addition of conventional assistants, for example, ethylene oxide condensation products of high molecular weight amines, and, above all, for dyeing cellulose materials, in particular cotton, for example by the exhaustion process for a dilute liquor, from alkaline baths optionally having a high salt content, and in particular by the pad-dyeing process, in which the goods are impregnated with aqueous dyestuff solutions which optionally also contain salt, and the dyes are fixed after an alkali treatment or in the presence of alkali, optionally with the action of heat.

The water-soluble reactive dyes are also suitable for printing, in particular on cotton, and also for printing nitrogen-containing fibres, for example wool, silk or fibre blends containing wool.

The dyeings and prints are distinguished by interesting and valuable, very bright and brilliant shades. The dyeings and prints possess a good stability to acids and alkalis, and a good stability to synthetic resin finishing agents, have a good fastness to light and, in particular on cotton, an outstanding fastness to wet processing. The high degree of fixation and the easy removability of non-fixed dyestuff is also deserving of mention.

In order to improve the wet fastness properties, it is advisable to rinse the dyeings and printings obtained thoroughly with cold and hot water, optionally with the addition of an agent which has a dispersing effect and promotes the diffusion of the non-fixed material.

In the examples which follow, the parts, unless otherwise indicated, denote parts by weight, and the percentages denote percentages by weight. The relationship of parts by weight to parts by volume is the same as of the gram to the cm³.

EXAMPLE 1

21.3 parts of 2-bromo-3-cyano-4,6-diaminopyridine, 18.6 parts of aniline and 100 parts of chlorobenzene are refluxed with stirring for 4 hours. The pH is adjusted to 8 to 9 with sodium hydroxide solution and the chlorobenzene as well as excess aniline are distilled off with steam. After the residue has been cooled, the product is washed neutral with water and subsequently dried. The product of the formula

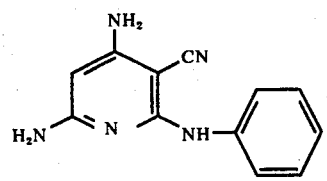

is obtained.

EXAMPLE 2

42.6 parts of 2-bromo-3-cyano-4,6-diaminopyridine, 70 parts of metanilic acid and 400 parts of normal sodium hydroxide solution are stirred at 160° C in an autoclave. After the batch has been cooled, the pH is adjusted to 2-3 with hydrochloric acid. The precipitated product is filtered off, washed with water and dried.

The product of the constitution

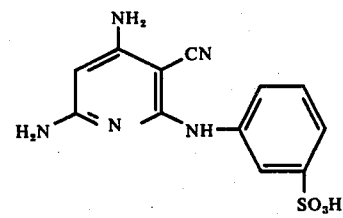

is obtained.

EXAMPLE 3

2.77 parts of 4-aminoazobenzene-3'-sulphonic acid are added 60 40 parts of acetic acid, 3 parts of hydrochloric acid and 40 parts of water. Then 3 parts of 4 normal sodium hydroxide solution are added dropwise at 0° to 5° C and the batch is stirred for 1 hour at the same temperature. The excess nitrite is destroyed with sulphamic acid and the solution is clarified by filtration. To this diazo solution is added dropwise at 0° C to 5° C the coupling solution obtained by dissolving 2.25 parts of 2-phenylamino-3-cyano-4,6-diaminopyridine in 60 parts of dimethyl formamide and 10 parts of water. After the coupling, stirring is performed for 1 hour at 0° to 5° C. The precipitated dye is filtered off, washed with water and dried. It has the formula

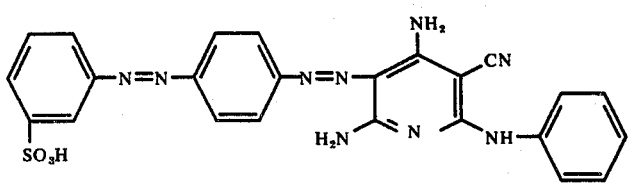

and dyes wood and polyamide fibres in yellow shades which are fast to light and wet treatments.

EXAMPLE 4

1.97 parts of 4-aminoazobenzene are added to 80 parts of acetic acid and 3 parts of hydrochloric acid. Then 3 parts of a 4 normal sodium nitrite solution are added dropwise at 0° to 5° C and the batch is stirred for 15 minutes at the same temperature. The excess nitrite is destroyed with sulphamic acid and the solution is clarified by filtration. To this diazo solution is added dropwise at 0° to 5° C the coupling solution obtained by suspending 3.05 parts of 2-(3'-sulphophenyl-amino)-3-cyano-4,6-diaminopyridine in 40 parts of water and treating the suspension with sodium hydroxide solution until a clear, brown solution forms.

After the coupling, the pH is adjusted to 5 with sodium hydroxide solution. The precipitated dye is filtered off, washed with water and dried. The resultant dye has the formula

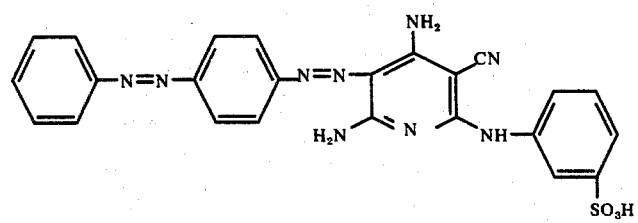

and dyes wool and polyamide fibers in yellow shades which are fast to light and wet treatments.

Further azo dyes which dye wool and polyamide fibres in yellow shades are obtained by diazotising the diazo components listed hereinbelow with the coupling components which are subsequently also listed hereinbelow. With respect to the diazo and coupling components to be used, the procedure to be followed is such that the resultant azo dye contains 1 to 3, but preferably 1 to 2, sulphonic acid groups.

DIAZO COMPONENTS 1-amino-2-chlorobenzene,
1-amino-3-acrylylaminobenzene-6-sulphonic acid,
2-amino-4-(α,β-dibromopropionylamino)-benzene-1-sulphonic acid,
2-amino-5-(α,β-dibromopropionylamino)-benzene-1-sulphonic acid,
2-amino-4-(α,β-dichloropropionylamino)-benzene-1-sulphonic acid,
2-amino-5-(3',4'-dichlorobenzoylamino)-benzene-1-sulphonic acid,
2-amino-5-(2',4'-dichlorobenzoylamino)-benzene-1-sulphonic acid,
1-amino-4-(2',4'-dichlorobenzoylamino)-benzene-2,5-disulphonic acid,
2-amino-4-(2',4'-dichlorobenzoylamino)-benzene-1-sulphonic acid,
2-amino-4-(3',4'-dichlorobenzoylamino)-benzene-1-sulphonic acid,
1-aminophenyl-2-sulphonic acid-cyclohexylmethylamide,
2-amino-5-sulpho-benzoic acid,
1-aminophenyl-2-sulphonic acid-diethyl amide,
1-amino-2,3-dichlorobenzene,
1-aminobenzene-2,4-disulphonic acid,
1-aminophenyl-2-sulphonic acid-methylphenylamide,
1-amino-2-chlorobenzene-5-sulphonic acid,
1-aminophenyl-2-sulphonic acid-ethylphenylamide,
1-amino-2,4-dichlorobenzene,
1-aminobenzene-2,5-disulphonic acid,
1-amino-2,4,6-trichlorobenzene,
2-amino-4-(4'-chlorobenzoylamino)-benzene-1-sulphonic acid,
1-amino-3,5-dichlorobenzene,
1-amino-3-(α,β-dibromopropionylamino)-benzene-4,6-disulphonic acid,
1-amino-3,4-dichlorobenzene,
1-amino-4(α,β-dibromopropionylamino)-benzene-2,5-disulphonic acid,
1-amino-2,5-dichlorobenzene,
2-amino-4-(2',5'-dichlorobenzoylamino)-benzene-1-sulphonic acid,
1-amino-2,6-dichlorobenzene,
1-amino-4-(α,β-dibromopropionylamino)-benzene-2,6-disulphonic acid,
1-aminobenzene-2-sulphonic acid,
1-amino-3-acetylaminobenzene-6-sulphonic acid,
1-amino-3-benzoylaminobenzene-6-sulphonic acid,
1-amino-4-acetylaminobenzene-6-sulphonic acid,
1-amino-4-benzoylaminobenzene-6-sulphonic acid,
2-amino-4-(α-bromoacrylylamino)-benzene-1-sulphonic acid,
1-amino-4-(4'-chloro-3'-nitrobenzoylamino)-benzene-2,5-disulphonic acid,

COUPLING COMPONENTS 2-(2'-sulphophenylamino)-3-cyano-4,6-diaminopyridine,
2-(3'-sulphophenylamino)-3-cyano-4,6-diaminopyridine,
2-(4'-sulphophenylamino)-3-cyano-4,6-diaminopyridine,
2-morpholino-3-cyano-4,6-diaminopyridine,
2-piperidino-3-cyano-4,6-diaminopyridine,
2-methylamino-3-cyano-4,6-diaminopyridine,
2-N-methyl-N-phenylamino-3-cyano-4,6-diaminopyridine,
2N-ethyl-N-phenylamino-3-cyano-4,6-diaminopyridine,
2-N-hydroxyethyl-N-phenylamino-3-cyano-4,6-diaminopyridine,
2-benzylamino-3-cyano-4,6-diaminopyridine,
2-(3'-sulphobenzylamino)-3-cyano-4,6-diaminopyridine,
2-N-methyl-N-(3'-sulphophenyl)-amino-3-cyano-4,6-diaminopyridine,
2-N-ethyl-N-(3'-sulphophenyl)-amino-3-cyano-4,6-diaminopyridine.

EXAMPLE 5

40.2 parts of 4-(1',2'-dibromopropionylamino)-aniline-2-sulphonic acid are stirred in 500 parts of water. Then 60 parts by volume of α-naphthalenesulphonic acid (31 vol. %) are added and diazotisation is effected by the dropwise addition of 25 parts by volume of 4 normal sodium nitrite solution. A solution of 32.7 parts of 2,4-diamino-5-cyano-6-anilino-(3'-sulpho)-pyridine in 250 parts of water are passed into the resultant diazo compound which contains no nitrous acid. The pH of the coupling mixture is kept at 6.5 to 7.5 by the dropwise addition of 2 normal sodium hydroxide solution. The coupling is terminated after several hours. The dye is precipitated by addition of sodium chloride, subsequently filtered off, washed with 15% saline solution and dried at 70° to 80° C, to yield a yellow powder which dissolves in water and dyes wool and polyamide from a weakly acid bath in yellow shades which are very fast to light and wet treatments.

The dye has the formula

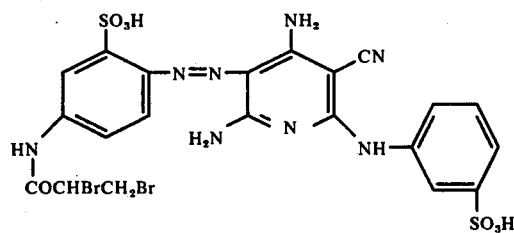

Similar dyes which dye wool and polyamides in yellow shades are obtained by diazotising the compounds in column I of the Table in the conventional way and coupling them with the coupling components listed in column II.

| I | II |
| --- | --- |
| 2-amino-4-(α-bromoacrylyl-amino)-benzene-1-sulphonic acid | 2-(3'-sulphophenylamino)-3-cyano-4,6-diaminopyridine |
| '' | 2-(4'-sulphophenylamino)-3-cyano-4,6-diaminopyridine |
| '' | 2-(2'-sulphophenylamino)-3-cyano-4,6-diaminopyridine |
| '' | 2-piperidino-3-cyano-4,6-diaminopyridine |
| 1-aminobenzene-2,5-disulphonic acid | 2-piperidino-3-cyano-4,6-diaminopyridine |
| 2-amino-5-(α,β-dibromo-propionylamino)-benzene-1-sulphonic acid | 2-(4'-α,β-dibromopropionyl-amino-3'-sulphophenylamino-3-cyano-4,6-diaminopyridine |
| '' | 2,4-di-(isopropylamino)-6-di-(β-hydroxyethyl)-amino-pyridine |
| '' | 2-piperidino-4,6-diamino-pyridine-3-carbonamide |
| 1-aminobenzene-2-sulphonic acid | 2,4-di-(isopropylamino)-6-di-(β-hydroxyethyl)-amino-pyridine |
| 2-amino-4-(α,β-dibromo-propionylamino)-benzene-1-sulphonic acid | '' |
| '' | 2,4,6-tri-(methylamino)-3-cyanopyridine |
| '' | 2-piperidino-3-cyano-4-methyl-amino-6-amino-pyridine |
| 1-amino-4-(α,β-dibromo-propionylamino)-benzene-2,6-disulphonic acid | 2-piperidino-4,6-diamino-pyridine-3-carbonamide |

EXAMPLE 6

27.8 parts of 2-amino-5-(α,β-dibromopropionyl)-amino-4'-methyl-1,1'-diphenylsulphone-3'-sulphonic acid are suspended in 300 parts of water. The suspension is treated with 60 parts of a 31% α-naphthalenesulphonic acid and diazotisation is effected in the normal way by passing in 12.5 parts by volume of a 4 normal sodium nitrite solution. Any excess nitrite present is subsequently destroyed with sulphamic acid. A neutral solution of 16 parts of 2,4-diamino-5-cyano-6-(3'-sulphophenyl)-amino in 300 parts of water is then added to the diazo solution which contains no nitrous acid. A 2 normal sodium carbonate solution is added dropwise with stirring at 20° to 25° C until the coupling is terminated. The dye is precipitated by adding sodium chloride, filtered off and washed with a 15% saline solution and dried in vacuo to yield an orange powder which dissolves in hot water and dyes wool and polyamide in fast, orange shades.

EXAMPLE 7

The procedure of Example 6 is carried out. After termination of the coupling, the dyestuff suspension is cooled to 5° to 10° C and 2 normal sodium hydroxide solution is added dropwise until a pH of 12.5 is attained. Stirring is continued for 30 minutes at this pH, during which time the dibromopropionyl group is converted into the α-bromoacrylic group. Neutralisation to pH 7 is then effected by addition of 2 normal hydrochloric acid and the dye is precipitated as described in the previous Example.

Similar dyes which dye wool and polyamides in the shades indicated in column IV of the following Table are obtained by monoacylating the diamines of column I with the fibre-reactive acylating agents of column II, diazotising the resultant products in conventional manner and coupling them with with indicated coupling components.

| | I | II | III | IV |
| --- | --- | --- | --- | --- |
| 1 | 2,5-diamino-4'-methyl-1,1'-diphenylsulphone-3'-sulphonic acid | trichloracrylic chloride | 2-(3'-sulphophenyl-amino)-3-cyano-4,6-diaminopyridine | reddish yellow |
| 2 | '' | chloroacetyl chloride | '' | '' |
| 3 | '' | bromoacetyl chloride | | '' |
| 4 | 4,5-diamino-1,1'-diphenyl-sulphone-3'-sulphonic acid | α,β-dibromopro-pionyl chloride | '' | '' |
| 5 | '' | acrylic chloride | 2-(4'-sulphophenyl-amino)-3-cyano-4,6-diaminopyridine | '' |
| 6 | '' | α,β-dichloropro-pionyl chloride | '' | '' |
| 7 | 2,5-diamino-4'-chloro-1,1'-diphenylsulphone-3'- | α,βdibromopro-pionyl chloride | 2-(2'-methoxy-4'-sulphophenylamino)- | '' |

-continued

| | I | II | III | IV |
|---|---|---|---|---|
| | sulphonic acid | | 3-cyano-4,6-diamino-pyridine | |
| 8 | " | α,β-dichloropropionyl chloride | " | " |
| 9 | 2,4-diamino-1,1'-diphenyl-sulphone-3'-sulphonic acid | α,β-dibromopropionyl chloride | " | " |
| 10 | 2,4-diamino-4'-methyl-1,1'- | " | 2-(3'-sulphophenyl-amino)-3-cyano-4,6-diaminopyridine | " |
| 11 | " | α,β-dichloropropionyl chloride | " | " |
| 12 | 2,4-diamino-4'-methyl-1,1'-diphenylsulphone-3'-sulphonic acid | chloroacetyl chloride | 2-(3'-sulphophenyl-amino)-3-cyano-4,6-diaminopyridine | reddish yellow |
| 13 | " | bromoacetyl chloride | " | " |
| 14 | " | acrylic chloride | " | " |
| 15 | " | 6-methoxy-2,4-dichloro-1,3,5-triazine | " | " |
| 16 | " | trichloropyrimidine | " | " |
| 17 | " | tetrachloropyrimidine | " | " |
| 18 | " | 6-methoxyethoxy-2,4-dichloro-1,3,5-triazine | " | " |
| 19 | " | 2,4,6-trifluoro-1,3,5-triazine | " | " |
| 20 | 2,5-diamino-4-methoxy-4'-methyl-1,1'-diphenyl-sulphon-3'-sulphonic acid | chloroacetychloride | " | orange |
| 21 | " | α,β-dibromopropionyl chloride | " | " |
| 22 | " | " | 2-(4'-sulphophenyl-amino)-3-cyano-4,6-diaminopyridine | " |
| 23 | 2,5-diamino-4-methoxy-4'-methyl-1,1'-diphenyl-sulphon-3'-sulphonic acid | α,β-dibromopropionyl chloride | 2-(2'-methoxy-4'-sul-phophenylamino)-3-cyano-4,6-diaminopyridine | orange |

EXAMPLE 8

A solution of 18.5 parts of cyanuric chloride in 50 parts of acetone is poured into a neutralised solution of 17.3 parts of 1-aminobenzene-3-sulphonic acid in 100 parts of water and 1000 parts of ice and the pH is kept at 6 to 7 during the condensation by the dropwise addition of 2 normal sodium hydroxide solution. After termination of the condensation, a neutral solution of 1,3-diaminobenzene-4-sulphonic acid is added and the pH of the solution is kept at 6 to 7 by the dropwise addition of 2 normal sodium hydroxide solution after it has been warmed to 20°–25° C. As soon as it is no longer possible to detect any diaminobenzenesulphonic acid in the mixture, 7 parts of sodium nitrite are added and after this has dissolved, the batch is poured onto a mixture of 200 parts of ice and 25 parts of concentrated hydrochloric acid. The yellow suspension of the diazo compound is stirred for 1 hour in an ice bath and subsequently a small surplus of nitrous acid is destroyed by addition of sulphamic acid. A solution of 32.7 parts of the sodium salt of 2-(3'-sulpho-phenylamino)-3-cyano-4,6-diaminopyridine in 160 parts of water is then poured into this diazo suspension. The pH, which initially is 1.5, is raised to 7 by the dropwise addition of sodium hydroxide solution, in the process of which a clear yellow solution is obtained. This solution is stirred for 1 hour at pH 7 and the dye is precipitated by the addition of potassium chloride. The resultant dye dyes cotton in bright, yellow shades.

Further yellow dyes are obtained by condensing, according to the particulars of this Example, the amines listed in column I of the following Table with cyanuric chloride, condensing the resultant monocondensation products with the diamines in column II, diazotising, and coupling the diazo compounds with the coupling components in column III.

| | I amine | II diamine | III coupling component |
|---|---|---|---|
| 1 | 1-aminobenzene-3-sulphonic acid | 1,3-phenylenediamine-4-sulphonic acid | 2-(2'-hydroxyethylamino)-3-cyano-4,6-diaminopyridine |
| 2 | " | " | 2-morpholino-4,6-diamino-3-cyanopyridine |
| 3 | 1-aminobenzene-2,4-disulphonic acid | " | 2-piperidino-3-cyano-4,6-diaminopyridine |
| 4 | 1-aminobenzene-2,5-disulphonic acid | 1,4-phenylenediamine-2-sulphonic acid | 2-hexoxy-3-cyano-4,6-diaminopyridine |
| 5 | 4-aminobenzylsulphonic acid | 1,3-phenylenediamine-4-sulphonic acid | 2-methylamino-3-cyano-4,6-diaminopyridine |
| 6 | 2-amino-5-sulphobenzoic acid | " | 2-(bis-2'-hydroxyethylamino)-3-cyano-4,6-diaminopyridine |
| 7 | 4-aminobenzoic acid | 1,3-phenylenediamine-4,6-disulphonic acid | 2-phenylamino-3-cyano-4,6-diaminopyridine |
| 8 | 3'-amino-2,4-bis-phenyl-amino-6-chloro-1,3,5-triazine-4',3''-disulphonic acid | 1,3-phenylenediamine-4-sulphonic acid | 2-(3'-sulphophenylamino)-3-cyano-4,6-diaminopyridine |
| 9 | 1-amino-3-chloroacetyl-aminomethylbenzene-6-sulphonic acid | " | " |

-continued

| | I amine | II diamine | III coupling component |
|---|---|---|---|
| 10 | aniline-N-ω-methanesulphonic acid | '' | '' |

EXAMPLE 9

Further dyes which dye the fabrics listed in column III of the following Table in the respective shades are obtained according to the particulars of this Example by diazotisation of the diazo components listed in column I and as coupling component that listed in column III.

| | I | II | III |
|---|---|---|---|
| 1 | 2-amino-4,6-dichloro-1,3,5-triazine | 1,4-phenylenediamine-3-sulphonic acid | 2-(3',5'-disulphophenylamino)-3-cyano-4,6-diaminopyridine |
| 2 | 2,4,5,6-tetrachloro-pyrimidine | '' | 2-(4'-sulphomethylphenylamino)-3-cyano-4,6-diaminopyridine |
| 3 | 2,4-dichloropyrimidine-5-carboxylic acid chloride | 2,4-diamino-5-sulpho-benzoic acid | 2,4,6-triamino-3-cyanopyridine |
| 4 | 2,4-dichloro-6-[5'-(4''-chloro-6''-amino-1,3,5-triazin-2''-yl-amino]phenylamino-1,3,5-triazine-2'-sulphonic acid | 1,3-phenylenediamine-4-sulphonic acid | 2-piperidino-3-cyano-4,6-diamno-pyridine |
| 5 | 2,3-dichloroquinoxaline-6-sulphonic acid chloride | 1,4-diaminobenzene-2,6-disulphonic acid | 2-(2'-methoxyapropylamino)-3-amino-carbonyl-4,6-diaminopyridine |
| 6 | 5-cyano-2,4,6-trichloro-pyrimidine | '' | 2-propylamino-3-cyano-4,6-di-aminopyridine |
| 7 | 2,4,6-trifluoro-5-chloro-pyrimidine | 1,3-phenylenediamino-4-sulphonic acid | 2-(3'-sulphophenylamino)-3-cyano-4,6-diaminopyridine |
| 8 | 2,4-dichloro-6-iso-propoxy-1,3,5-triazine | '' | '' |
| 9 | 2,4,6-trichloro-1,3,5-triazine | '' | '' |
| 10 | 2-(2'-sulphophenylamino)-4,6-dichloro-1,3,5-triazine | 1,3-phenylenediamino-4-sulphonic acid | 2-(4'-sulphophenoxy)-3-cyano-4,6-diaminopyridine |
| 11 | '' | 1,3-phenylenediamine | 2-(3'-methylpiperidino)-3-cyano-4,6-diaminopyridine |
| 12 | 2-(2'-ethoxy-ethoxy)-4,6-dichloro-1,3,5-triazine | 1,4-phenylenediamine-2,5-disulphonic acid | 2,4-di-isopropylamino-5-cyano-6-aminopyridine |
| 13 | 2-(3'-sulphophenylamino)-4,6-dichloro-1,3,5-triazine | 1,3-phenylenediamine-4-sulphonic acid | 2-(3'-methoxypropylamino)-4,6-diamino-3-cyanopyridine |
| 14 | 4,5-dichloropyridazone-propionic acid chloride | '' | 2,4-diamino-5-cyano-6-bis-(2'-hydroxyethylamino)-pyridine |
| 15 | 2-methyl-4,6-dichloro-1,3,5-triazine | '' | 2,4-diamino-5-cyano-6-(3'-sulphophenylamino)-pyridine |
| 16 | 2-methanesulphonyl-4-chloro-6-methylpyrimidine | '' | 2,4-diamino-6-cyclohex-oxy-5-cyano-pyridine |

9.4 parts of 1,3-diaminobenzene-4-sulphonic acid are suspended in 100 parts of water and dissolved by addition of alkali to a pH of 7. To this solution are added at room temperature and with good stirring 10.4 parts of 2-isopropoxy-4,6-dichloro-1,3,5-triazine and the pH is kept at 6–7 during the condensation by the dropwise addition of 2 normal sodium hydroxide solution. Upon termination of the condensation, the condensation mixture is cooled with ice to 0° C, 13 parts by volume of concentrated hydrochloric acid are added, and the diazotisation is effected by the dropwise addition of 50 parts of normal sodium nitrite solution. A solution of 14.6 parts of the sodium salt of 2-(N-methyl-N-2'-sulpho-ethylamino)-3-cyano-4,6-diaminopyridine in 60 parts of water in then poured into the resultant diazo suspension and the coupling mixture is adjusted to a pH of 7 by the dropwise addition of 5 normal sodium hydroxide solution within 1 hour. The dye is isolated from the yellow dyestuff solution by addition of potassium chloride. It dyes cotton in fast yellow shades.

Further yellow dyes with similar properties are obtained by using as diamine the compound listed in column II of the Table, as acylating agent that listed in column I and as coupling component that listed in column III.

EXAMPLE 10

17.3 parts of 2-aminobenzenesulphonic acid are dissolved in 100 parts of water with the addition of 5,5 parts of anhydrous sodium carbonate. The resultant solution is treated with 25 parts by volume of 4 normal sodium nitrite solution and the batch is poured onto 100 parts of ice and 25 parts by volume of concentrated hydrochloric acid. The suspension of the diazo compound is adjusted to a pH of 8.5 by addition of 10% sodium carbonate solution. A solution of 19.3 parts of 2-(2'-hydroxyethylamino)-3-cyano-4,6-diaminopyridine in 100 parts of N,N-dimethyl formamide is then added and the pH of the reaction mixture is kept at 8.5 to 9 during the coupling. After termination of the coupling, the dye is precipitated from the yellow dye solution by addition of sodium chloride. It dyes fabrics made from synthetic polyamide material in fast, yellow shades.

Further dyes which dye the fabrics listed in column III of the following Table in the respective shades are obtained according to the particulars of this Example by diazotisation of the diazo components listed in column I and coupling these with the coupling components in column II.

phonate. A cotton fabric is impregnated with the resultant solution to 75% liquor pick-up and then

| | I | II | III |
|---|---|---|---|
| 1 | 1-amino-4-chlorobenzene | 2-(3'-sulphophenylamino)-3-cyano-4,6-diaminopyridine | yellow on polyamide |
| 2 | 1-amino-4-methylsulphonyl benzene | " | " |
| 3 | sulphanilic acid | 2-morpholino-3-cyano-4,6-diaminopyridine | " |
| 4 | 2-naphthylamine-1-sulphonic acid | " | " |
| 5 | 1-aminobenzene-2,5-disulphonic acid | 2-piperidino-3-cyano-4,6-diaminopyridine | " |
| 6 | " | 2-methylamino-3-cyano-4,6-diaminopyridine | " |
| 7 | 2-amino-5-sulphobenzoic acid | 2-(N-methyl-N,2'-hydroxyethylamino)-3-cyano-4,6-diaminopyridine | " |
| 8 | 1-amino-4-(β-sulphatoethylsulphonyl)-benzene | " | yellow on cotton |
| 9 | 1-amino-4-(β-sulphatoethylsulphoamido)-benzene | 2-(N,N-bishydroxyethylamino)-3-cyano-4,6-diaminopyridine | " |
| 10 | 1-amino-2-trifluoromethyl-4-chlorobenzene | 2-(3',5'-disulphophenylamino)-3-cyano-4,6-diaminopyridine | yellow on polyamide |
| 11 | 4'-aminophenyl-2-sulphatoethylsulphone | 2-N,N-bishydroxyethylamino-3-cyano-4,6-diaminopyridine | reddish yellow on cotton |
| 12 | 2-aminonaphthalene-1,5-disulphonic acid | 2,4,6-triamine-3-cyano-pyridine | orange on polyamide |
| 13 | 3-aminopyridine | 2-(3'-sulphophenylamino)-3-cyano-4,6-diaminopyridine | reddish yellow |
| 14 | 2-aminothiophene | " | reddish yellow |
| 15 | 2-aminobenzthiazole | " | reddish yellow |
| 16 | 5-amino-3-phenyl-1,2,4-thiadiazole | " | orange on polyamide |
| 17 | 2-aminonaphthalene-3,6,8-trisulphonic acid | 2-hexylamino-3-cyano-4,6-diaminopyridine | reddish yellow on polyamide |

DYEING EXAMPLES 1. 10 parts of wool flannel are put at 40° C into a batch which contains 500 parts of water, 0.5 part of crystalline sodium sulphate. 0.4 part by volume of acetic acid and 0.2 part of the dye according to Example 4. The temperature is raised uniformly to the boil within 30 minutes and the goods are dyed for 1 hour at boiling temperature. The dyed goods are then rinsed and finished in the usual way. A very level, bright yellow dyeing is obtained.

By using the same amount of sulphuric acid instead of acetic acid and dyeing as described in the Example, there is obtained a yellow dyeing with the same properties.

2. 10 parts of synthetic polyamide fabric is put at 40° C into a dyebath which contains 500 parts of water, 0.40 part of 40% acetic acid, 0.25 part of the sulphonate of ricinolic acid butyl ester and 0.20 part of the dye according to Example 3. The temperature is raised uniformly to boiling point within 30 minutes and dyeing is performed for 1 hour at the low boil. The fabric is subsequently rinsed and dried to yield a level, non-stripy dyeing of good fastness to washing and light.

3. A dyebath is prepared by dissolving 2 parts of the dye obtained according to Example 5 in 4000 parts of water and adding 10 parts of crystallised sodium sulphate. Then 100 parts of thoroughly wetted wool are put into this dyebath at 40° to 50° C. Then 2 parts of 40% acetic acid are added, the dye-bath is brought to the boil within half an hour and dyeing is performed for ¾ hour at the boil. Finally, the wool is rinsed with cold water and dried. The wool is dyed in wash-fast yellow shades of good fastness to light.

4. 2 parts of the dye obtained according to Example 9, Table 2, are dissolved in 100 parts of water with the addition of 0.5 part of sodium m-nitrobenzenesulphonate. A cotton fabric is impregnated with the resultant solution to 75% liquor pick-up and then dried.

The fabric is then impregnated with a 20° C warm solution which contains 5 g of sodium hydroxide and 300 g of sodium chloride per liter, squeezed out to 75% liquor pick-up, steamed for 60 seconds at 100° to 101° C, rinsed, soaped for a quater of an hour in a 0.3% boiling solution of an ion-free detergent, rinsed and dried. A bright, yellow dyeing of excellent fastness to light and wet treatments is obtained.

5. A dyebath is prepared by dissolving 1.5 parts of the dye obtained according to Example 6 in 4000 parts of water and adding 4 parts of ammonium sulphate, 5 parts of crystallised sodium sulphate, 1 part of 80% acetic acid and 1 part of the addition product of oleylamine and ethylene oxide the manufacture of which is described hereinbelow. Into this dyebath are put 100 parts of thoroughly wetted chlorinated wool at 30° C. The dyebath is brought to the boil over the course of 30 minutes and dyeing is performed for 50 minutes at the boil. The bath is then cooled to 80° C and adjusted to a pH of 8.5 by addition of ammonia. The wool is dyed for a further 15 minutes in this bath. Finally, the goods are rinsed and dried. The wool is dyed in wash-fast, brilliant yellow shades of good fastness to light.

MANUFACTURE OF THE ETHYLENE OXIDE ADDITION PRODUCT:

100 parts of commercial oleylamine are treated with 1 part of finely divided sodium and heated to 140° C, whereupon ethylene oxide is passed in at 135° to 140° C. As soon as the ethylene oxide has been rapidly taken up, the reaction temperature is lowered to 120° to 125° C and the passing in of ethylene oxide is continued until 113 parts of ethylene oxide have been taken up. The resultant reaction product is soluble in water to give a substantially clear solution.

6. 2 parts of the dye obtained according to Example 8 are dissolved in 100 parts of water with the addition of 0.5 part of sodium m-nitrobenzenesulphonate. A cotton fabric is impregnated with the resultant solution to 75% liquor pick-up and then dried.

The fabric is then impregnated with a 20° C warm solution which contains 5 g of sodium hydroxide and 300 g of sodium chloride per liter and squeezed out to 75% liquor pick-up. The dyeing is steamed for 60 seconds at 100° to 101° C, rinsed, soaped for a quater of an hour in a 0.3% boiling solution of an ion-free detergent, rinsed and dried. A yellow dyeing is obtained.

7. 2 parts of the dye obtained according to Example 8 are dissolved in 100 parts of water. The solution is added to 3900 parts of cold water, 80 parts of sodium chloride are added and 100 parts of a cotton fabric are put into this dye-bath.

The temperature is raised to 80° C over the course of 45 minutes, with 40 parts of trisodium phosphate and a further 80 parts of sodium chloride being added after 30 minutes. The temperature is kept for 30 minutes at 80° C and the dyeing is rinsed, soaped for 15 minutes in a 0.3% boiling solution of an ion-free detergent, rinsed and dried. A yellow dyeing which is fast to washing and light is obtained.

8. 2 parts of the dye manufactured according to Example 9 are strewn with rapid stirring into 100 parts of a stock thickening which contains 45 parts of 5% sodium alginate thickening, 32 parts of water, 20 parts of urea, 1 part of sodium m-nitrobenzenesulphonate and 2 parts of sodium carbonate.

A cotton fabric is printed with the resultant printing paste on a roller printer and the printed material is steamed for 4 to 8 minutes at 100° C in saturated steam. The printed fabric is then thoroughly rinsed in cold and in hot water, in the process of which the non-fixed amounts of dye can be very easily removed from the fibres, and subsequently dried. A yellow print is obtained.

9. 2 parts of the dye obtained according to Example 5 are dissolved in 100 parts of an aqueous solution which contains 20 g of trisodium phosphate and 10 g of disodium sulphate per liter. A cotton fabric is impregnated on a padder with this solution and the excess liquid is squeezed out to a liquor pick-up of 75% of the fabric. The impregnated, moist fabric is rolled up and stored for 6 hours at 25° C. The fabric is then rinsed, soaped for 15 minutes at 100° C, thoroughly rinsed again and dried. A yellow dyeing of good fastness to light and good wet fastness properties is obtained.

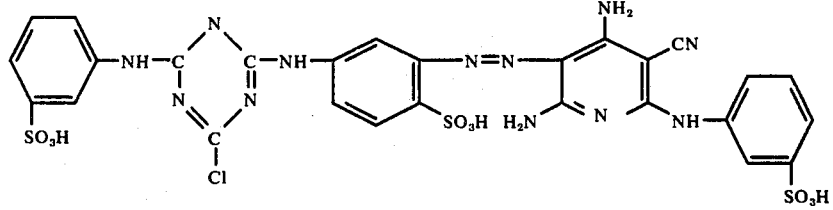

We claim:

1. A water-soluble azo dye of the formula

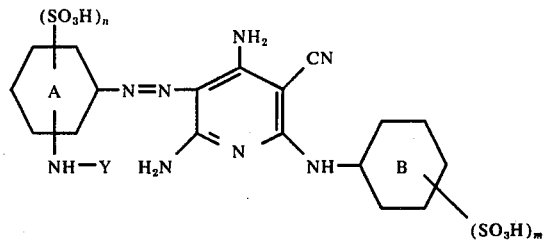

wherein Y is an aliphatic acyl or heterocyclic fiber-reactive group capable of reacting with the hydroxy groups of cellulose or with the amino groups of polyamides to form a covalent chemical bond therewith; $n$ is 1 or 2; $m$ is 0, 1 or 2; the benzene ring A is further unsubstituted or substituted by halo, lower alkyl, lower alkoxy, nitro or carboxy; and the benzene ring B is further unsubstituted or substituted by lower alkyl, lower alkoxy, nitro, carboxy, or is -NHY wherein Y is independently as defined above.

2. A water-soluble azo dye according to claim 1, wherein Y is an aliphatic acyl fiber-reactive group.

3. A water-soluble azo dye according to claim 2, wherein Y is $\alpha,\beta$-dibromopropionyl or $\alpha$-bromoacryloyl.

4. A water-soluble azo dye according to claim 1, wherein Y is a heterocyclic fiber-reactive group.

5. A water-soluble azo dye according to claim 4, wherein Y is 4,6-dihalogeno-s-triazinyl-(2) or 4-halogeno-6-amino, alkoxy, phenoxy, alkylmercapto or arylmercapto)-s-triazinyl-(2).

6. The water-soluble azo dye according to claim 1, of the formula

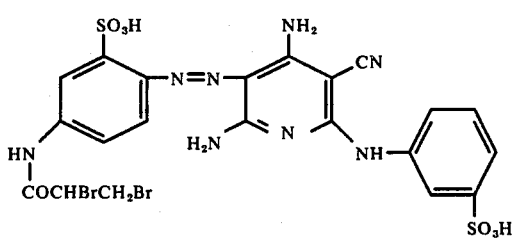

7. The water-soluble azo dye according to claim 1, of the formula